UNITED STATES PATENT OFFICE.

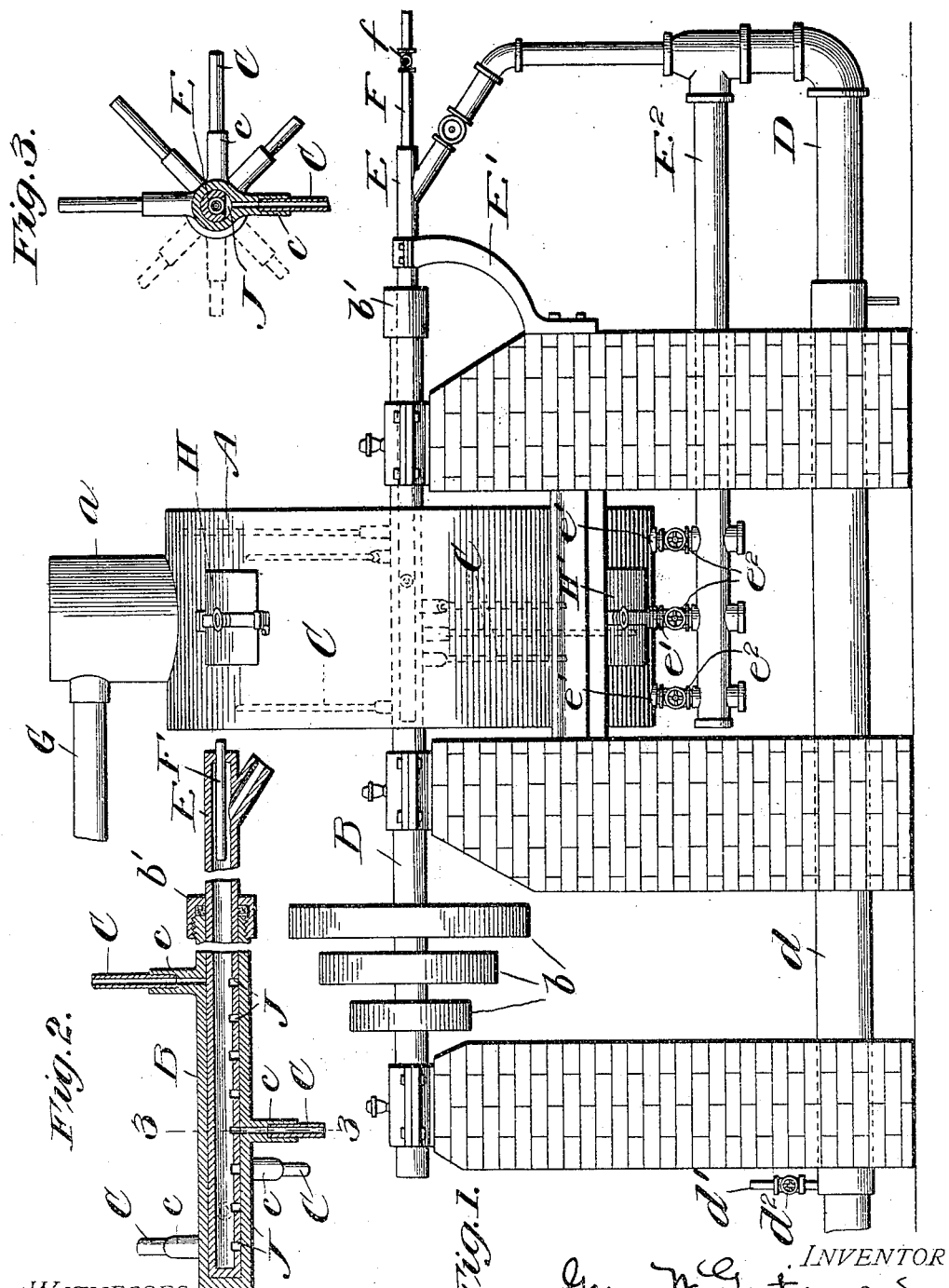

GEORGE W. GENTIEU AND ROBERT S. WADDELL, OF PEORIA, ILLINOIS.

APPARATUS FOR MAKING SMOKELESS POWDER.

No. 808,036.   Specification of Letters Patent.   Patented Dec. 19, 1905.

Application filed August 14, 1905. Serial No. 274,195.

*To all whom it may concern:*

Be it known that we, GEORGE W. GENTIEU and ROBERT S. WADDELL, citizens of the United States, residing at Peoria, in the county of Peoria and State of Illinois, have invented certain new and useful Improvements in Apparatus for Making Smokeless Powder; and we do hereby declare the following to be a full, clear, and exact description of the invention, such as will enable others skilled in the art to which it appertains to make and use the same.

Our invention consists in the novel features hereinafter described, reference being had to the accompanying drawings, which illustrate one form in which we have contemplated embodying our invention, and the invention is fully disclosed in the following description and claims.

Referring to the drawings, Figure 1 represents an elevation of an apparatus for the manufacture of explosive materials, such as gunpowder, and embodying our invention. Fig. 2 is a detail sectional view of the stirrer-shaft, illustrating the means for supplying compressed air and solvent to the material treated. Fig. 3 is a transverse sectional view on line 3 3 of Fig. 2.

In the drawings, A represents a tank or receptacle, preferably cylindrical in form and supported in any desired manner. This tank is provided at its upper portion with a manhole closed by a removable manhole-cover H for charging material into the tank, and said tank is also provided with a similar manhole, adjacent to its lower portion, closed by a removable cover H' for the removal of the material after it has been operated upon. The upper part of the tank is conveniently provided with a dome $a$, from which an exhaust-pipe G leads. B represents a hollow stirrer-shaft supported in suitable bearings and extending through the tank A. The shaft B is provided with driving means, in this instance a series of pulleys $b$ of varying diameters, by means of which it may be driven at various speeds. Within the tank A the shaft B is provided with a series of hollow beater-arms arranged spirally around the shaft and communicating with the interior thereof. The shaft B is preferably formed of cast-iron and provided with a series of nipples $c$, into which are screwed pipes C, extending radially from the shaft and forming the beater-arms.

E represents a stationary pipe for the introduction of compressed air, which fits within the hollow shaft B and is provided on its lower side with a series of ports J, arranged to communicate with the hollow beater-arms while they are moving through the material in the tank A and are below a horizontal position. This construction causes the compressed air to be delivered through the ports J and through the nipples $c$ and hollow arms C only when said hollow arms are in position extending downwardly from the shaft, so that the compressed air is of necessity discharged within the material operated upon and adjacent to the bottom of the tank A, as will be readily understood. The shaft B is provided with a gland or stuffing-box $b'$, surrounding the compressed-air pipe E, to prevent the escape of air around said pipe, and the pipe E is held from rotation in any convenient manner, as by a bracket E', as shown.

We also prefer to provide a series of nozzles $e'$ $e'$ $e'$ in the bottom of the tank A, communicating with a branch pipe $E^2$ for supplying compressed air, said nozzles being controlled by valves $e^2$ $e^2$ $e^2$ for supplying jets of compressed air through the bottom of the tank for operating upon the material therein, if desired.

F represents a pipe extending into and discharging within the air-pipe E and provided with a suitable valve $f$, by means of which the solvent liquid is introduced into the stream of compressed air in the pipe E and thence passes through the hollow stirring-arms C and is sprayed into the material.

D represents a supply-pipe for the compressed air, which may be supplied by any suitable form of air-compressing mechanism, said pipe $d$ being connected to both pipes E and $E^2$ and being provided with a steam-jacket $d$, to which steam may be admitted by a pipe $d'$, controlled by a valve $d^2$, as shown, for the purpose of heating the compressed air when it is desired to use it at a higher temperature than normal.

In using this apparatus for the manufacture of explosive material, such as gunpowder, nitrocellulose, which has been pulped by the well-known method, washed, and deprived of surplus moisture by passing it through a centrifugal wringer, is charged into the tank A by removing the manhole-cover H. The shaft or axle B of the stirring device is operated by means of power from a suitable motor and at the desired speed, and compressed air is admitted through pipe E within the hollow shaft and discharged downwardly through the material while it is being agitated to break up the nitrocellulose into porous grains. This action may also be assisted, if desired, by introducing compressed air into the bottom of the tank A through the nozzles e' e' e'. The desired solvent is then admitted to the pipe E through the pipe F from a suitable source of supply and will pass with the compressed air through the stirrer-arms and will be sprayed into the material while it is being lifted and agitated by the stirrer-arms C, and thus uniformly colloid the grains. When the predetermined amount of solvent has been introduced, steam is admitted to the steam-jacket $d$ for the purpose of heating the compressed air in the pipe D to a temperature not to exceed 43° centigrade, and the heated compressed air is forced into and through the material, with the effect of removing the surplus solvent and partially drying the colloided grains. The compressed air after operating upon the material rises into the dome at the top of the tank A and passes therefrom to the exhaust-pipe G, which preferably conducts it to a condenser, (not shown,) where the vapors of the solvent employed are condensed and recovered, and the air is delivered to the compressing mechanism at a comparatively low temperature and used over again. The grains of powder are removed by detaching the manhole-cover H' and are ready to be sieved and form a valuable smokeless powder.

In lieu of the steam-jacket herein disclosed for heating the compressed air any other convenient form of heating apparatus may be employed, and in other ways we do not desire to be limited to the exact details of construction herein shown and described, as variations may be made therein without departing from the spirit of our invention.

The process of making gunpowder herein described and which may be conveniently carried into effect by means of this apparatus, is not herein claimed, as it forms the subject-matter of a separate application for patent, filed by us August 14, 1905, Serial No. 274,194.

What we claim, and desire to secure by Letters Patent, is—

1. In a machine for the manufacture of an explosive material, the combination with a receptacle, of a rotatable hollow shaft extending therethrough and provided with a plurality of hollow radial arms communicating with the interior of said shaft, a stationary pipe extending within said shaft and provided on its lower side with ports adapted to communicate with said hollow arms, substantially as described.

2. In a machine for the manufacture of an explosive material, the combination with a receptacle, of rotating stirring devices located therein, means for introducing compressed air into said stirring devices and discharging it therefrom adjacent to the bottom of the receptacle, and means for introducing a liquid into said stirring devices, with the compressed air and discharging it therewith adjacent to the bottom of the receptacle, substantially as described.

3. In a machine for the manufacture of an explosive material, the combination with a receptacle, of rotating stirring devices located therein, means for introducing compressed air into said stirring devices and discharging it therefrom adjacent to the bottom of the receptacle, means for introducing a liquid into said stirring devices with the compressed air and discharging it therewith adjacent to the bottom of the receptacle, a controlling-valve for said liquid, and a heating device for heating the compressed air before it enters said receptacle, whereby the supply of liquid may be cut off and heated air under pressure may be passed through the material to remove surplus liquid, substantially as described.

4. In an apparatus for the manufacture of an explosive, the combination with a receptacle or tank, a hollow rotatable shaft passing therethrough and provided within said receptacle with a plurality of hollow arms communicating with the interior of said shaft, a stationary compressed-air pipe fitting within said hollow shaft, and provided with ports on its lower side adapted to register with said hollow arms, a liquid-supply pipe extending into and discharging within the said air-pipe, and means for controlling the supply of liquid through said pipe, substantially as described.

5. In an apparatus for the manufacture of an explosive, the combination with a receptacle or tank, a hollow rotatable shaft passing therethrough and provided within said receptacle with a plurality of hollow arms communicating with the interior of said shaft, a stationary compressed-air pipe fitting within said hollow shaft, and provided with ports on its lower side adapted to register with said hollow arms, a liquid-supply pipe extending into and discharging within the said air-pipe, a valve for controlling said liquid-pipe and a heater for heating the compressed air, substantially as described.

6. In an apparatus for the manufacture of an explosive, the combination with a receptacle or tank, a hollow rotatable shaft pass ing therethrough and provided within said receptacle with a plurality of hollow arms communicating with the interior of said shaft, a stationary compressed-air pipe fitting within said hollow shaft, and provided with ports on its lower side, adapted to register with said hollow arms, a liquid-supply pipe extending into and discharging within said air-pipe, a valve for controlling said liquid-pipe, a series of nozzles discharging into the said receptacle adjacent to the bottom thereof, a pipe for supplying compressed air thereto, a supply-pipe for supplying compressed air to said hollow arms and to said nozzles, and a steam-jacket surrounding said supply-pipe for heating the compressed air, substantially as described.

In testimony whereof we affix our signatures in the presence of two witnesses.

GEORGE W. GENTIEU.
ROBERT S. WADDELL.

Witnesses as to the signature of George W. Gentieu:
W. F. DOYLE,
L. P. WHITAKER.

Witnesses as to the signature of Robert S. Waddell:
R. S. WADDELL, Jr.,
MABEL G. HANNUM.